(12) United States Patent
Lipetz et al.

(10) Patent No.: US 7,739,323 B2
(45) Date of Patent: Jun. 15, 2010

(54) SYSTEMS, METHODS AND COMPUTER PROGRAM PRODUCTS FOR PROVIDING A COMBINED MODULI-9 AND 3 RESIDUE GENERATOR

(75) Inventors: Daniel Lipetz, Flushing, NY (US); Bruce M. Fleischer, Bedford Hills, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 11/425,185

(22) Filed: Jun. 20, 2006

(65) Prior Publication Data

US 2007/0294330 A1    Dec. 20, 2007

(51) Int. Cl.
 *G06F 7/38* (2006.01)
(52) U.S. Cl. ...................................... 708/491
(58) Field of Classification Search .................. 708/491
 See application file for complete search history.

(56) References Cited

U.S. PATENT DOCUMENTS

| | | | |
|---|---|---|---|
| 3,816,728 A | 6/1974 | Chen et al | |
| 4,190,893 A | 2/1980 | Gajski | |
| 4,346,451 A * | 8/1982 | Katayama | 708/491 |
| 4,742,479 A * | 5/1988 | Kloker et al. | 708/491 |
| 5,008,849 A | 4/1991 | Burgess et al. | |
| 6,195,386 B1 | 2/2001 | Oh | |
| 6,901,515 B1 | 5/2005 | Muratani | |
| 2005/0151777 A1 | 7/2005 | Silverbrook | |

* cited by examiner

*Primary Examiner*—Tan V Mai
(74) *Attorney, Agent, or Firm*—Cantor Colburn LLP; John Campbell

(57) ABSTRACT

Systems, methods and computer program products for providing a combined moduli-9 and 3 residue generator. The methods include receiving a number in binary coded decimal (BCD) or binary format. A modulus-9 residue of the number is calculated. The modulus-9 residue that is calculated includes a modulus-3 residue of the number. The modulus-3 residue of the number is output. If the number is in BCD format, then the modulus-9 residue of the number is output.

25 Claims, 7 Drawing Sheets

BCD TO BASE 3 CONVERTER

| BCD INPUT | Base3 MSB <0,1,2> | Base3 LSB <0,1,2> | Base3 DEC |
|---|---|---|---|
| 0000 | 100 | 100 | # 0 0 |
| 0001 | 100 | 010 | # 0 1 |
| 0010 | 100 | 001 | # 0 2 |
| 0011 | 010 | 100 | # 1 0 |
| 0100 | 010 | 010 | # 1 1 |
| 0101 | 010 | 001 | # 1 2 |
| 0110 | 001 | 100 | # 2 0 |
| 0111 | 001 | 010 | # 2 1 |
| 1000 | 001 | 001 | # 2 2 |
| 1001 | 100 | 100 | # 0 0 |
| 1010 | -- | 010 | # - 1 |
| 1011 | -- | 001 | # - 2 |
| 1100 | -- | 100 | # - 0 |
| 1101 | -- | 010 | # - 1 |
| 1110 | -- | 001 | # - 2 |
| 1111 | -- | 100 | # - 0 |

TABLE 1.1

| Base3 | <0,1,2> |
|---|---|
| 0 | 100 |
| 1 | 010 |
| 2 | 001 |

TABLE 1.2

In<0:3>

BCD → Base3

HIGH<0:2>    LOW<0:2>

ROTATOR TO ADD

| INPUT A | INPUT B | OUTPUT |
|---------|---------|--------|
| 100 | 100 | 100 |
| 010 | 100 | 010 |
| 001 | 100 | 001 |
| 100 | 010 | 010 |
| 010 | 010 | 001 |
| 001 | 010 | 100 |
| 100 | 001 | 001 |
| 010 | 001 | 100 |
| 001 | 001 | 010 |

TABLE 2.1

| Base3 | <0,1,2> |
|-------|---------|
| 0 | 100 |
| 1 | 010 |
| 2 | 001 |

TABLE 2.2

2
INPUT A<0:2>   INPUT B<0:2>

ROTATOR TO ADD

OUTPUT<0:2>

SYSTEMS, METHODS AND COMPUTER PROGRAM PRODUCTS FOR PROVIDING A COMBINED MODULI-9 AND 3 RESIDUE GENERATOR

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention is related to the reliability of arithmetic hardware in computer processors, and in particular, it relates to residue checking in computer processors.

One way to ensure reliability in computer processor adders and multipliers is to check the results using a parallel circuit that calculates the residue of the operands and compares an expected residue to the actual residue of the result.

Residue checking may be utilized to provide protection from transient failures and/or early end of life failures in arithmetic circuits.

Modulus-15 residue generators have been utilized with binary/hexadecimal formatted numbers to check arithmetic circuits. The modulus-15 residue of an operand is the remainder of dividing the operand by 15. In this case, the modulus is one less than a hexadecimal systems radix. All powers of 16 have a remainder of 1 in a modulus-15 system. Due to this, the modulus-15 residue of a binary number is simply the sum of its hexadecimal digits. This may be represented as follows:

$X = \Sigma x_j 16^j;$ $res\ X = res(\Sigma res(res(x_j)res(16^j)))$, where $res(16^j)=1$ for all $j$;

$res\ X = res(\Sigma(res(x_j)))$; and $res\ X = res(x0 + x1 + \ldots + xn).$

A modulus-15 generator may be implemented by using a counter tree such as a 3:2 counter tree similar to a multiplier's implementation. This may be costly in terms of area and delay.

With the advent of complementary metal oxide semiconductor (CMOS), modulus-3 checking systems have become popular due to their speed and size. In addition, CMOS appears to have fewer transient fails and therefore, may not need as high a degree of checking as that provided by the modulus-15 generator. Modulus-3 checking systems reduce a base-4 system as shown below:

$X = \Sigma x_i 4^i;$ $res\ X = res(\Sigma res(res(x_i)res(4^i)))$, where $res(4^i)=1$ for all $i$;

$res\ X = res(\Sigma(res(x_i)))$; and $res\ X = res(x0 + x1 + \ldots + xn).$

A modulus-3 system may also be utilized for checking a base-10 system since every power of 10 has a remainder of 1 when divided by 3. So, just like the binary system, groups of 2 bits can be summed together in the form of a counter tree. A faster implementation of modulus-3 that uses pass-gate multiplexers that are extremely small and fast may also be utilized.

It would be desirable to have a residue generator with the speed of a modulus-3 system with the greater checking capabilities of a higher radix modulus.

BRIEF SUMMARY OF THE INVENTION

Exemplary embodiments include methods for performing a residue calculation. The methods include receiving a number in binary coded decimal (BCD) or binary format. A modulus-9 residue of the number is calculated. The modulus-9 residue of the number that is calculated includes a modulus-3 residue of the number. The modulus-3 residue of the number is output. If the number is in BCD format, then the modulus-9 residue of the number is output.

Embodiments also include systems for calculating a modulus-9 residue. The systems include an input mechanism, computer instructions and an output mechanism. The input mechanism receives a number in BCD or binary format. The computer instructions facilitate calculating a modulus-9 residue of the number. The calculated modulus-9 residue of the number includes a modulus-3 residue of the number. The output mechanism outputs the modulus-3 residue and further outputs the modulus-9 residue of the number if the number is in BCD format.

Further embodiments include computer program products for performing a residue calculation. The computer program products include a storage medium readable by a processing circuit and storing instructions for execution by the processing circuit for performing a method. The method includes receiving a number in BCD or binary format. A modulus-9 residue of the number is calculated. The modulus-9 residue of the number that is calculated includes a modulus-3 residue of the number. The modulus-3 residue of the number is output. If the number is in BCD format, then the modulus-9 residue of the number is output.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide a combined moduli-9 and 3 residue generator that may be utilized to perform residue checking for both binary and binary coded decimal (BCD) numbers in a computer system. Residue checking may be utilized to ensure reliability in adders and multipliers. Exemplary embodiments build on the design of modulus-3 residue generators which may be implemented using pass-gate multiplexers by first encoding every 2 bit group [In(0), In(1)] into 3 orthogonal output signals [res(0), res(1), and res(2)] as shown below:

$$res(0)=In(0)'In(1)'+In(0)In(1);$$

$$res(1)=In(0)'In(1); \text{ and}$$

$$res(2)=In(0)In(1)'.$$

One skilled in the art will recognize that base-3 numbers may be represented using two or more signals that may or may not be orthogonal. The particular representation in the above equations is just one example of many possible representations.

In exemplary embodiments, a tree of reduction cells is then formed, where each reduction cell receives Ares(0:2), and Bres(0:2), where A and B are different encoded digits or sums of encoded digits of input operand In, and form Sres(0:2) as outputs as shown below:

$$Sres(0)=Ares(0)Bres(0)+Ares(1)Bres(2)+Ares(2)Bres(1);$$

$$Sres(1)=Ares(0)Bres(1)+Ares(1)Bres(0)+Ares(2)Bres(2); \text{ and}$$

$$Sres(2)=Ares(0)Bres(2)+Ares(1)Bres(1)+Ares(2)Bres(0).$$

The carry out of the sum is ignored because it has a value of 6, which has a modulus-3 residue of 0. In exemplary embodiments, the three equations above are implemented by a two by three and/or gate. In alternate exemplary embodiments, since Ares(0), Ares(1), and Ares(2) are orthogonal, the three equations above are implemented with a pass-gate multiplexer. Pass-gate multiplexers are small in size and fast in operation.

Figure 1:
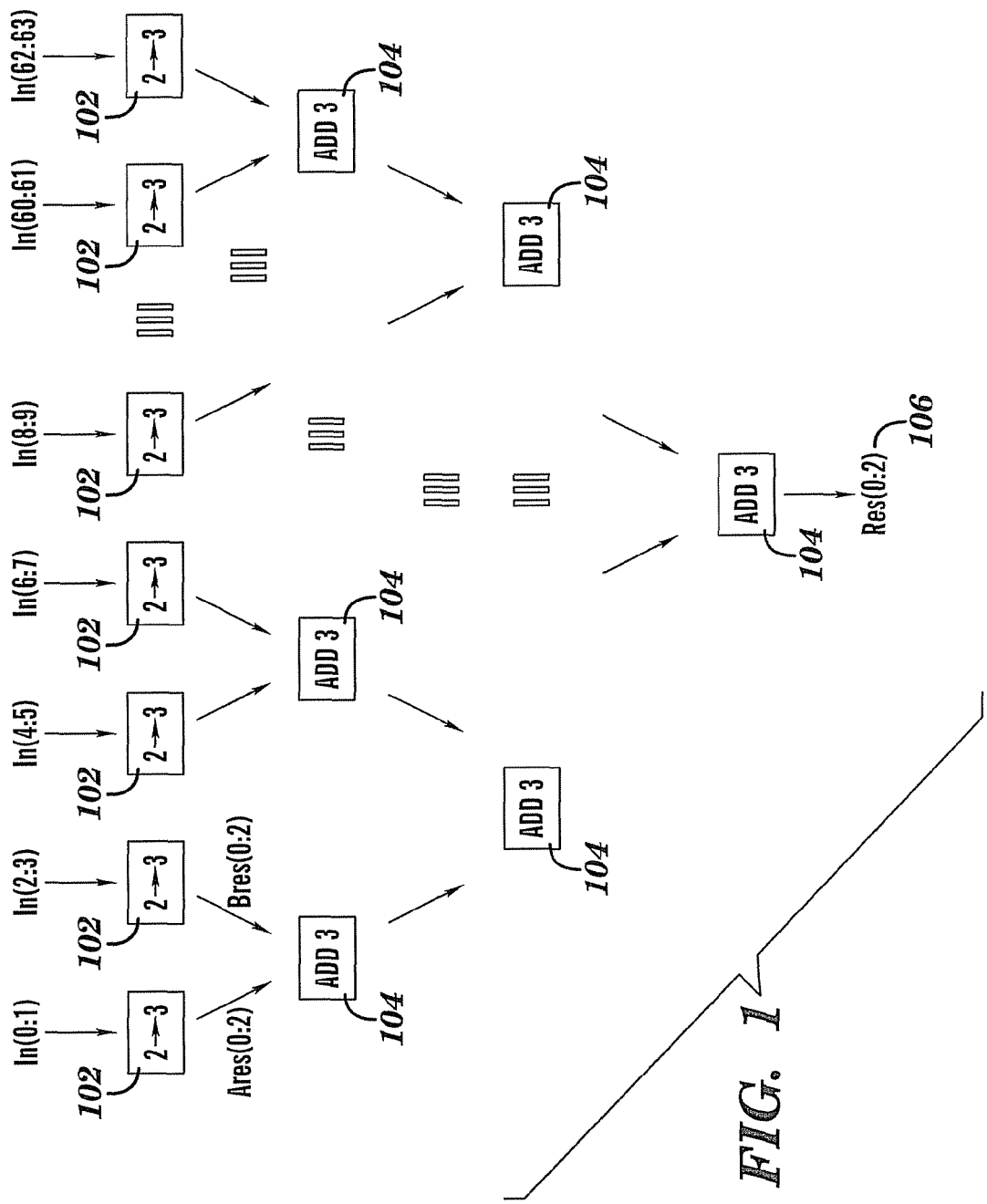
FIG. 1 depicts the structure of an exemplary residue 3 reduction tree.

FIG. 1 shows an example of a reduction tree that may be utilized to generate a modulus-3 residue of a binary input (In) using BCD to base-3 converters 102, with two bits as input and three orthogonal signals as output from each BCD to base-3 converter 102. In addition, FIG. 1 depicts base-3 addition blocks 104 for reducing six signals to three signals. Each stage of the tree reduces the number of signals by half. The final output of the tree 106 includes three signals that represent the modulus-3 residue of the entire 64 bit input.

Exemplary embodiments include a new checking system which utilizes modulus-3 gates but is connected in a way to provide either a modulus-9 or modulus-3 residue. In exemplary embodiments, first a modulus-9 residue is calculated for decimal formats and then modulus-3 is a relatively simple extension of this logic. In exemplary embodiments, the input operand is separated into hex digits (part of BCD number system in this example) as shown by the following:

$$X=\Sigma x_j 10^j;$$

$$res\ X=res(\Sigma res(res(x_j)res(10^j)))), \text{ where } res(10^i)=1 \text{ for all } i;$$

$$res\ X=res(\Sigma(res(x_j))); \text{ and}$$

$$res\ X=res(x0+x1+\ldots+xn).$$

Note that modulus-9 residue of $16^j$ is not 1 for an arbitrary j, and therefore this result is not valid for hexadecimal numbers.

Next, the modulus-9 residues are broken into two base-3 sets of numbers as shown below:

$$x_i=x_{i,1}3^1+x_{i,0}3^0;$$

$$x_i=x_{i,1}3+x_{i,0}, \text{ with } x_{i,1} \text{ and } x_{i,0} \in \{0,1,2\};$$

$$res\ X=res(\Sigma(x_{i,1}3+x_{i,0})); \text{ and}$$

$$res\ X=res(res(\Sigma x_{i,1})3+res\ \Sigma x_{i,0}).$$

The modulus-9 residue of this BCD number is the sum of the residues of the low order bits ($x_{i,0}$) plus the sum of the residues of the high order bits ($x_{i,1}$) times 3. The result of this scheme is two modulus-3 values. The low order value is the sum of the low order residues. The high order value is the sum of the high order residues plus the carry value of the sum of the low order values. Note that the carry value of the high order sum is ignored, because it has a value of 10, which has a modulus-9 residue value of 0. Further notice that the low order value is the modulus-3 residue of the BCD input number, and is also valid if the input number is hexadecimal. Thus, the modulus-3 residue of the hexadecimal input is generated as part of the modulus-9 result.

In exemplary embodiments, the modulus-9 residue is generated in a similar manner to the modulus-3 residue. Every four bit group [In(0), In(1), In(2), In(3)] is encoded into 6 output signals:

$$High<0>=(High<1>+High<\ >)';$$

$$High<1>=(In<0>'In<1>In<2>')+(In<1>'In<2>In<3>);$$

$$High<2>=(In<1>In<2>)+(In<0>In<1>'In<2>'In<3>');$$

$$Low<0>=(Low<1>+Low<2>)';$$

$$Low<1>=(In<0>'In<1>In<2>'In<3>')+$$
$$(In<0>In<1>'In<2>In<3>')+$$
$$(In<0>'In<1>'In<2>'In<3>)+$$
$$(In<0>'In<1>In<2>'In<3>)+$$
$$(In<0>In<1>'In<2>In<3>); \text{ and}$$

$$Low<2>=(In<0>In<1>'In<2>'In<3>')+$$
$$(In<0>'In<1>'In<2>In<3>')+$$
$$(In<0>'In<1>'In<2>In<3>)+$$
$$(In<0>'In<1>In<2>In<3>)+$$
$$(In<0>In<1>'In<2>In<3>').$$

One skilled in the art would recognize that base-3 numbers may be represented using two or more signals that may or may not be orthogonal. The particular representation in the above equations is just one example of many possible representations.

In exemplary embodiments, a tree is formed of reduction cells where each reduction cell contains two adders, one for the low bits and one for the high bits, and an incrementer for adding the carry value of the sum of the low bits to the high bits.

Figure 2:
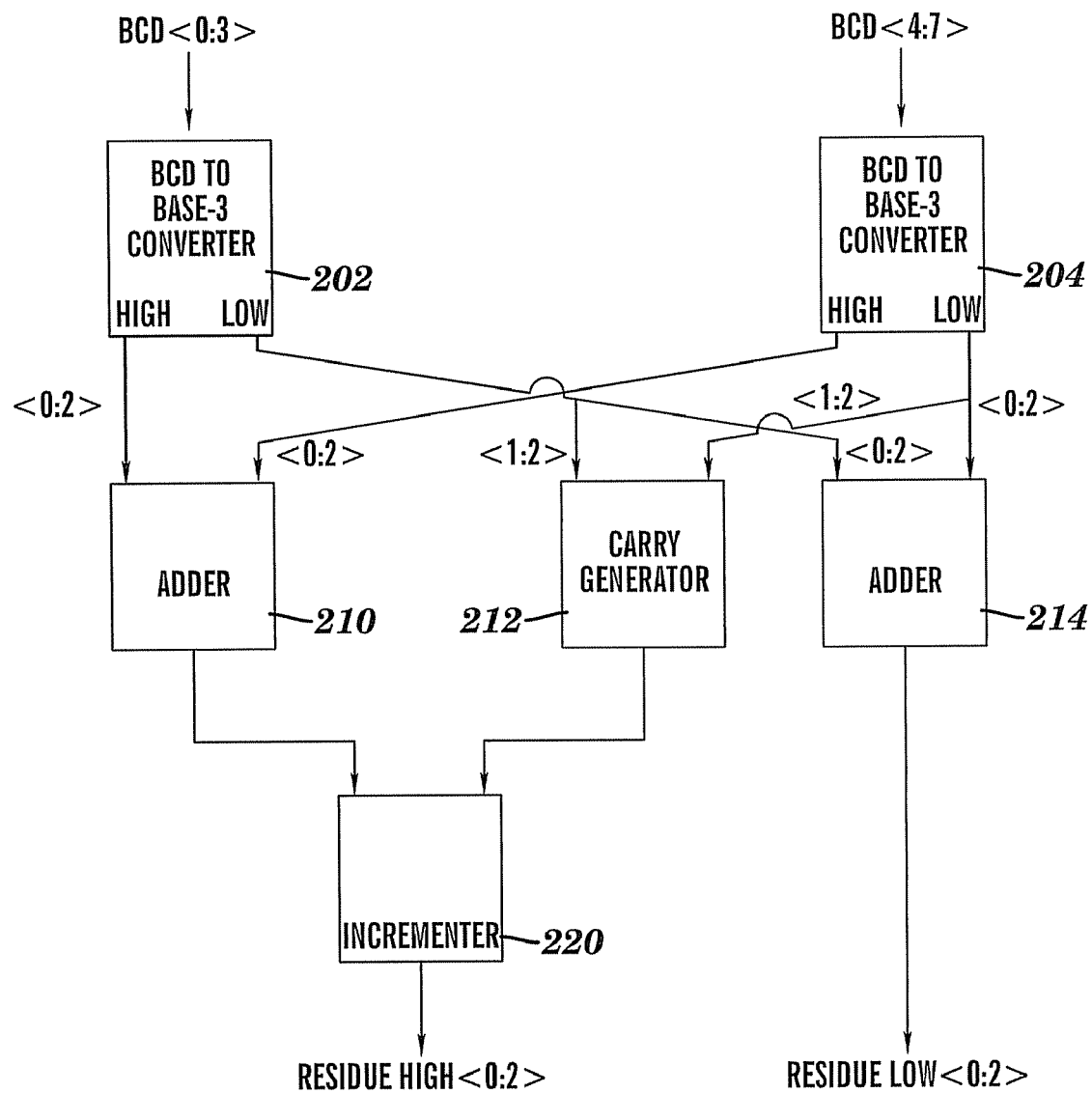
FIG. 2 illustrates an exemplary structure of a combined moduli-9 and 3 residue generator for 8 bits, or 2 BCD digits, that may be implemented by exemplary embodiments.

FIG. 2 illustrates a block flow diagram of how a combined moduli-9 and 3 residue generator for eight bits may be implemented by exemplary embodiments. The flow depicted in FIG. 2 is implemented by computer instructions that may include hardware and/or software components.

The residue generator includes a number represented as two groups of four bits including an input string of BCD<0:3> and an input string of BCD<4:7> representing two BCD digits or eight hexadecimal bits. The BCD<0:3> input string is input to a BCD to base-3 converter 202. The BCD<4:7> input string is input to a second BCD to base-3 converter 204. The input strings are input to the BCD to base-3 converters 202 and 204 via an input mechanism, such as, but not limited to, an input port and/or a receiver. The input number may be received, for example from an error detection program or circuitry. The high outputs (also referred to herein as high values) from BCD to base-3 converter 202 and BCD to base-3 converter 204 are input to adder 210. The low outputs (also referred to herein as low values) from BCD base-3 converter 202 and BCD base-3 converter 204 are input to adder 214. The two least significant bits from the low outputs of BCD to base-3 converter 202 and BCD to base-3 converter 204 are input to carry generator 212.

The output of adder 210 and carry generator 212 are input into incrementer 220. The output of adder 214 is the modulus-3 residue of the eight bit input. The output of incrementer 220 is the most significant digit of the modulus-9 residue of the sixteen bit input. The output of adder 214 is the least significant digit of the modulus-9 residue of the eight bit input. Values are output from the incrementer 220 and the adder 214 via an output mechanism, such as, but not limited to, an output port and/or a transmitter. In exemplary embodiments, the output values are transmitted to an error detection program or circuitry.

Figure 3:
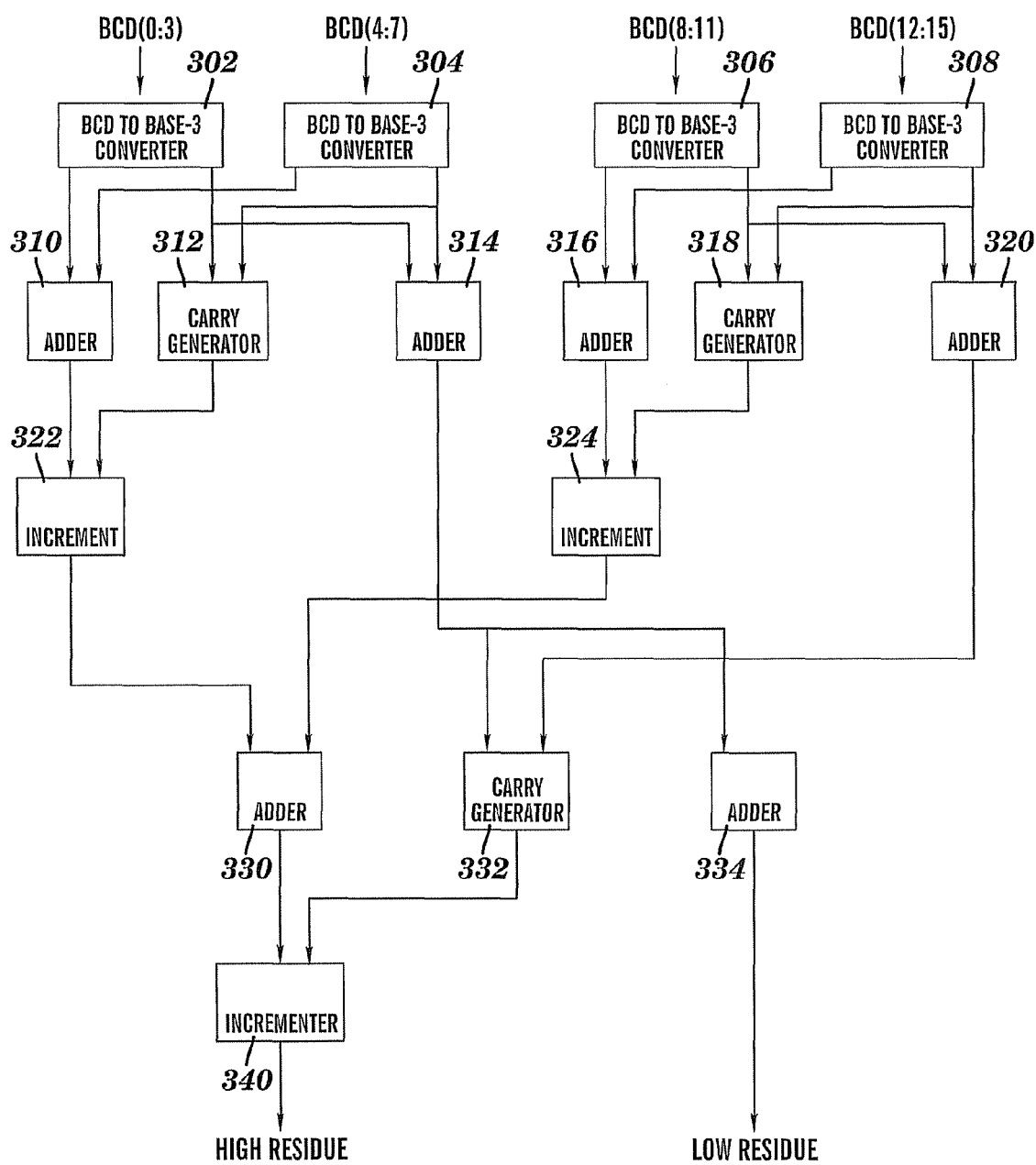
FIG. 3 illustrates an exemplary combined moduli-9 and 3 residue generator for 16 bits, or 4 BCD digits, that may be implemented by exemplary embodiments.

FIG. 3 illustrates a block flow diagram of how a combined moduli-9 and 3 residue generator for sixteen bits may be implemented by exemplary embodiments. The flow depicted in FIG. 3 is implemented by computer instructions that may include hardware and/or software components.

FIG. 3 illustrates how a residue of a string of sixteen bits could be implemented by exemplary embodiments. As depicted in FIG. 3, a number, represented as an input string, includes groups of four bits: BCD<0:3>, BCD<4:7>, BCD<8:11> and BCD<12:15>, representing four BCD digits or sixteen hexadecimal bits. BCD digit BCD<0:3> is input into BCD to base-3 converter 302, BCD<4:7> is input into BCD to base-3 converter 304, BCD<8:11> is input into BCD to base-3 converter 306, and BCD<12:15> is input into BCD to base-3 converter 308. The input strings are input to the BCD to base-3 converters (302 304 306 308) via an input mechanism, such as, but not limited to, an input port and/or a receiver. The input may be received, for example from an error detection program or circuitry.

The high outputs (also referred to herein as high values) from BCD to base-3 converter 302 and BCD to base-3 converter 304 are input into adder 310. The low outputs (also referred to herein as low values) from BCD to base-converter 302 and BCD to base-3 converter 304 are input into adder 314. The two least significant bits from the low outputs from BCD to base-converter 302 and BCD to base-3 converter 304 are input into carry generator 312. The outputs from adder 310 and the carry generator 312 are input to an incrementer 322.

The high outputs (also referred to herein as high values) from BCD to base-3 converter 306 and BCD to base-3 converter 308 are input into adder 316. The low outputs (also referred to herein as low values) from BCD to base-converter 306 and BCD to base-3 converter 308 are input into adder 320. The two least significant bits from the low outputs from BCD to base-converter 306 and BCD to base-3 converter 308 are input into carry generator 318. The outputs from adder 316 and the carry generator 318 are input to an incrementer 324. Thus, the first stage of the reduction tree is completed.

The second stage of the reduction tree in FIG. 3 sums the results from the first stage. The outputs from incrementer 322 and incrementer 324 (the high values) are input into adder 330. The outputs from adder 314 and adder 320 (the low values) are input to adder 334. The two least significant bits from adder 314 and adder 320 are input to a carry generator 332. The output of adder 330 and the carry generator 332 are input into incrementer 340. The output of adder 334 is the modulus-3 residue of the sixteen bit input. The output of the incrementer 340 is the most significant digit of the modulus-9 residue of the four digit BCD input and the output of adder 334 is the least significant digit of the modulus-9 residue of the input bits. Values are output from the incrementer 340 and the adder 334 via an output mechanism, such as, but not limited to, an output port and/or a transmitter. In exemplary embodiments, the output values are transmitted to an error detection program or circuitry.

Exemplary embodiments generalize the process depicted in FIGS. 2 and 3, using as many stages as necessary to reduce the result to a single modulus-9 residue. This modulus-9 residue is valid for any valid BCD input, but also contains within it the modulus-3 residue that is valid for both BCD inputs and hexadecimal inputs (e.g., four bits from a binary integer input). In a decimal floating-point unit, it is typical that most of the input data is in decimal format, but some of the input data is actually binary. Therefore, it is useful to have both moduli available. The circuit of the present invention is very fast and small due to the use of pass-gate multiplexers which is possible due to dividing the residue into a base-3 system which has 3 orthogonal states for each digit.

Exemplary embodiments may perform the sums in a different order than that shown in FIG. 3. For example, the carry values of the low sums may be tabulated and added to the high sum as a final calculation.

Figure 4:
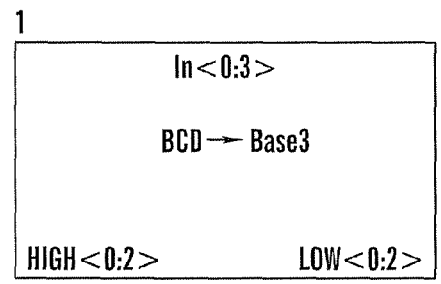
FIG. 4 illustrates an exemplary decoder of a BCD digit or any hexadecimal value that may be utilized by exemplary embodiments.

FIG. 4 illustrates one example of a BCD to base-3 encoder that may be utilized by exemplary embodiments. It has an input of four bits and two outputs. One output is the least significant base-3 digit. This is labeled Low<0:2>. The other output is the most significant base-3 digit. This is labeled High<0:2>. The second table labeled 1.2 in FIG. 4 shows the 3 orthogonal signals that represent a single base-3 value. The first table labeled 1.1 in FIG. 4 shows the relationship between the BCD input and the three high and three low signals that form the modulus-9 representation of the input. If the input is a non legal BCD number, the High<0:2> need not be generated because residue 9 is not significant in that case; only residue 3 is.

Figure 5:
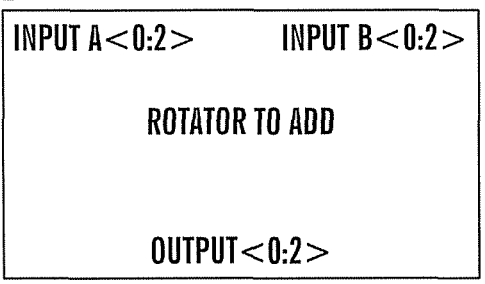
FIG. 5 illustrates an exemplary adder that adds by rotating that may be utilized by exemplary embodiments.

In an exemplary embodiment of the present invention, the adders are implemented using a fast and simple rotator such as the one depicted in FIG. 5. The adder depicted in FIG. 5 has two inputs: InputA<0:2> and InputB<0:2> which are base-3 signals as described in the second table, labeled 2.2, of FIG. 5. The output is the sum of the two inputs as described in the first table, labeled 2.1, of FIG. 5.

Figure 6:
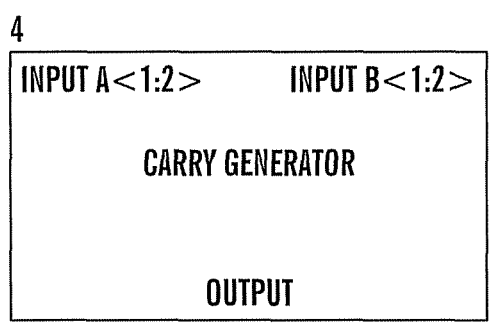
FIG. 6 illustrates an exemplary carry generator that may be utilized by exemplary embodiments.

FIG. 6 illustrates one example of a carry generator that may be implemented by exemplary embodiments. It has two inputs: InputA<1:2> and InputB<1:2>. It has one output: Output. This is used to determine if the least significant base-3 digit will produce a need to increment the most significant base-3 digits in the process. The first table in FIG. 6, labeled 4.1, describes the function of the block.

Figure 7:
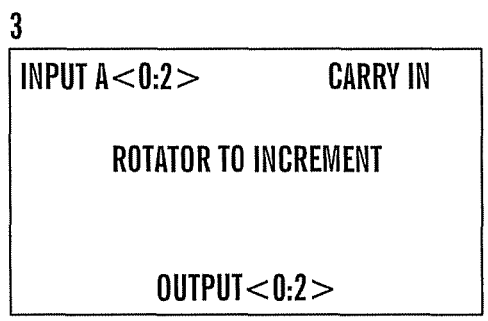
FIG. 7 illustrates an exemplary rotator to increment that may be utilized by exemplary embodiments.

In an exemplary embodiment of the present invention, the incrementor function is implemented using a fast and simple rotator. FIG. 7 depicts an exemplary rotator that may be utilized to increment the most significant base-3 digit in the process. It has two inputs: InputA<0:2> and Carryin. It has an output Output<0:2>. The table in FIG. 7, labeled 3.1, describes the function of the block.

Technical effects include the ability to use the same computer instructions (hardware and/or software) to perform residue checking for modulus-3 and modulus-9 inputs. Circuitry utilized by exemplary embodiments utilize pass-gate multiplexers which may result in circuitry that is very fast and small. Pass-gate multiplexers may be utilized by dividing the residue into a base-3 system which has three orthogonal states for each digit.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A computer implemented method for performing a residue calculation, the method comprising:
    receiving, at a residue generator, a number in binary coded decimal (BCD) or binary format;
    calculating, at the residue generator, a modulus-9 residue of the number, the modulus-9 residue of the number including a modulus-3 residue of the number;
    outputting the modulus-3 residue of the number; and
    outputting the modulus-9 residue of the number if the number is in BCD format.

2. The method of claim 1 wherein the calculating includes:
    calculating a modulus-9 residue for each group of four bits in the number, each modulus-9 residue for each group of four bits including a low value and a high value;
    summing the low values of the modulus-9 residues of each group of four bits resulting in the modulus-3 residue of the number and a carry value; and
    adding the carry value to a sum of the high values of the modulus-9 residues of each group of four bits resulting in a high value sum, wherein the modulus-9 residue of the number is three times the high value sum plus the modulus-3 residue of the number.

3. The method of claim 2 wherein a base-3 adder is utilized to perform one or more of the summing and the adding.

4. The method of claim 1 wherein the modulus-3 residue of the number is represented as three orthogonal signals.

5. The method of claim 4 wherein a base-3 adder is utilized to perform one or more of the summing and the adding.

6. The method of claim 5 wherein the base-3 adder includes a pass-gate multiplexer.

7. The method of claim 1 wherein the modulus-9 residue of the number is represented as two sets of three orthogonal signals.

8. The method of claim 7 wherein one of the two sets of three orthogonal signals is the modulus-3 residue of the number.

9. A system for calculating a modulus-9 residue, the system comprising:
    an input mechanism for receiving a number in BCD or binary format;
    computer instructions for facilitating calculating a modulus-9 residue of the number, the modulus-9 residue of the number including a modulus-3 residue of the number; and
    an output mechanism for outputting the modulus-3 residue of the number and for outputting the modulus-9 residue of the number if the number is in BCD format.

10. The system of claim 9 wherein the computer instructions are implemented in one or more of hardware and software.

11. The system of claim 9 wherein the calculating includes:
    calculating a modulus-9 residue for each group of four bits in the number, each modulus-9 residue for each group of four bits including a low value and a high value;
    summing the low values of the modulus-9 residues of each group of four bits resulting in the modulus-3 residue of the number and a carry value; and
    adding the carry value to a sum of the high values of the modulus-9 residues of each group of four bits resulting in a high value sum, wherein the modulus-9 residue of the number is three times the high value sum plus the modulus-3 residue of the number.

12. The system of claim 11 wherein a base-3 adder is utilized to perform one or more of the summing and the adding.

13. The system of claim of claim 9 wherein the modulus-3 residue of the number is represented as three orthogonal signals.

14. The system of claim 13 wherein a base-3 adder is utilized to perform one or more of the summing and the adding.

15. The system of claim 14 wherein the base-3 adder includes a pass-gate multiplexer.

16. The system of claim 9 wherein the modulus-9 residue of the number is represented as two sets of three orthogonal signals.

17. The system of claim 16 wherein one of the two sets of three orthogonal signals is the modulus-3 residue of the number.

18. A computer program product for performing a residue calculation, the computer program product comprising:
    a storage medium readable by a processing circuit and storing instructions for execution by the processing circuit for performing a method comprising:
        receiving a number in binary coded decimal (BCD) or binary format;
        calculating a modulus-9 residue of the number, the modulus-9 residue of the number including a modulus-3 residue of the number;
        outputting the modulus-3 residue of the number; and
        outputting the modulus-9 residue of the number if the number is in BCD format.

19. The computer program product of claim 18 wherein the calculating includes:
- calculating a modulus-9 residue for each group of four bits in the number, each modulus-9 residue for each group of four bits in the number including a low value and a high value;
- summing the low values of the modulus-9 residues of each group of four bits in the number resulting in the modulus-3 residue of the number and a carry value; and
- adding the carry value to a sum of the high values of the modulus-9 residues of each group of four bits in the number resulting in a high value sum, wherein the modulus-9 residue of the number is three times the high value sum plus the modulus-3 residue of the number.

20. The computer program product of claim 19 wherein a base-3 adder is utilized to perform one or more of the summing and the adding.

21. The computer program product of claim 18 wherein the modulus-3 residue of the number is represented as three orthogonal signals.

22. The computer program product of claim 21 wherein a base-3 adder is utilized to perform one or more of the summing and the adding.

23. The computer program product of claim 22 wherein the base-3 adder includes a pass-gate multiplexers.

24. The computer program product of claim 18 wherein the modulus-9 residue of the number is represented as two sets of three orthogonal signals.

25. The computer program product of claim 24 wherein one of the two sets of three orthogonal signals is the modulus-3 residue of the number.

* * * * *